United States Patent [19]

Moné et al.

[11] 4,159,969

[45] Jul. 3, 1979

[54] PROCESS FOR THE PREPARATION OF AGGLOMERATES OF POROUS ALUMINUM OXIDE

[75] Inventors: Rudolf A. J. Moné, Avenhorn; Gijsbertus Klaver, Ilpendam, both of Netherlands

[73] Assignee: Akzona Incorporated, Asheville, N.C.

[21] Appl. No.: 871,049

[22] Filed: Jan. 20, 1978

[30] Foreign Application Priority Data

Nov. 30, 1977 [NL] Netherlands .......................... 7700810

[51] Int. Cl.$^2$ ............................................. B01J 21/04
[52] U.S. Cl. .................................... 252/463; 252/448; 423/625
[58] Field of Search .................. 252/463, 448, 625; 423/628, 630

[56] References Cited

U.S. PATENT DOCUMENTS

| | | | |
|---|---|---|---|
| 3,972,990 | 8/1976 | Vesely | 423/630 X |
| 4,013,587 | 3/1977 | Fischer et al. | 252/463 X |
| 4,059,681 | 11/1977 | Hem et al. | 423/630 X |

*Primary Examiner*—W. J. Shine
*Attorney, Agent, or Firm*—Francis W. Young; Robert F. Green

[57] ABSTRACT

A process for the preparation of agglomerates of aluminium oxide is disclosed. The process comprises contacting a hydrous aluminium oxide gel with an organic liquid which is essentially immiscible with water. The organic liquid is utilized in an amount such that the weight ratio of said liquid to water, as contained in the hydrous gel, lies within Region II of a plot of said ratio versus the pore volume of aluminium oxide obtained after being dried and calcined. Subsequent to the gel being contacted with the organic liquid, the gel is subjected to agglomeration conditions. Region II of the referenced plot is a region in which the slope of the curve plotting the ratio of organic liquid to water versus the pore volume, as discussed above, has a value equal to or greater than about 4.0.

5 Claims, 2 Drawing Figures

PROCESS FOR THE PREPARATION OF AGGLOMERATES OF POROUS ALUMINUM OXIDE

BACKGROUND OF THE INVENTION

This invention relates to a process for making agglomerates of porous aluminium oxide and, in particular, to a process for making agglomerates of porous aluminium oxide from a hydrous aluminium oxide gel.

A process similar to that disclosed in the present specification is discussed in Netherlands Patent Application No. 6,604,215, which corresponds to British Pat. No. 1,129,980. In said reference, aluminium oxide agglomerates are obtained by drying an amorphous hydrated aluminium oxide slurry very rapidly and under such conditions that the amorphous state of the resulting fine powder is maintained. Subsequently, the powdered aluminium oxide is wetted with water or an ammonia solution and subsequently agglomerated. The agglomerates are then aged and calcined. The disadvantage of such a process is primarily that the aluminium oxide must first be dried and then subsequently rewetted, thus causing great processing time to be assumed.

Also, from the Journal of Catalysis, Volume 10, pages 342-354, 1968, and from U.S. Pat. No. 3,577,353, it is known that the direct drying of an aluminium oxide gel leads to severe shrinkage of said gel. The resulting high attraction between the gel particles may be attributed to the relatively high surface tension of the water contained in said gel. Consequently, after the gel has been dried, compact aluminium oxide, having a low pore volume, will be obtained. From the Journal reference and U.S. Pat. No. 3,577,353, it is also known that the shrinkage may be very much reduced by bringing the gel into contact with such an amount of an organic liquid that water contained in the gel is essentially replaced by the organic liquid, in its entirety. The only criterion which the organic substance must exhibit, according to the references, is that it has a lower surface tension than water. Methanol and ethanol, which are both water-miscible substances, are disclosed as being most suitable for such a purpose. Drying a gel treated in the foregoing manner leads to a powdered aluminium oxide having a relatively low density and a high porosity. Thus, the foregoing process does not produce agglomerates of aluminium oxide, but rather powders thereof.

U.S. Pat. No. 3,801,705 discloses a process similar to the foregoing, but relating to the preparation of silica gels, in which process there is utilized an organic solvent which is immiscible with water.

SUMMARY OF THE INVENTION

Surprisingly, it has now been found that agglomerates of aluminium oxide, which do not suffer from the shrinkage of the prior art, may be obtained directly. A process for the preparation of such agglomerates of porous aluminium oxide comprises contacting a hydrous aluminium oxide gel with an organic liquid which is essentially immiscible with water, the amount of liquid utilized being such that the weight ratio of such liquid to water, as contained in the gel, lies within Region II of a plot of said ratio versus the pore volume of aluminium oxide obtained after being dried and calcined, and subjecting the gel, subsequent to being contacted with the organic liquid, to agglomeration conditions.

The present invention thus discloses an improved process for the preparation of agglomerates of aluminium oxide wherein a hydrous aluminium oxide gel is contacted with an organic liquid prior to the drying of the gel. The improvement comprises utilizing as the organic liquid an organic compound having essentially no miscibility with water and contacting said gel with an amount of such organic compound so that the weight ratio of said organic compound to water, as contained in said hydrous gel, lies essentially within Region II of a plot of said ratio versus the pore volume of aluminium oxide obtained after drying and calcination.

Region II of the plot of the weight ratio of organic liquid versus pore volume is graphically demonstrated in FIG. I. Briefly, Region II of such a plot is the region in which the plotted curve has a steep slope, the slope having a value equal to or greater than about 4.0 when the pore volume is plotted in terms of milliliters per gram.

DESCRIPTION OF THE DRAWINGS

FIG. I is a hypothetical plot of the weight ratio of organic liquid to water contained in a hydrous aluminium oxide gel versus pore volume of aluminium oxide obtained after being dried and calcined.

FIG. II is a plot of the weight ratio of isoamyl alcohol to water contained in a hydrous aluminium oxide gel versus the pore volume of aluminium oxide obtained after being dried and calcined, expressed in terms of milliliters per gram.

DESCRIPTION OF PREFERRED EMBODIMENTS

Figure 1:
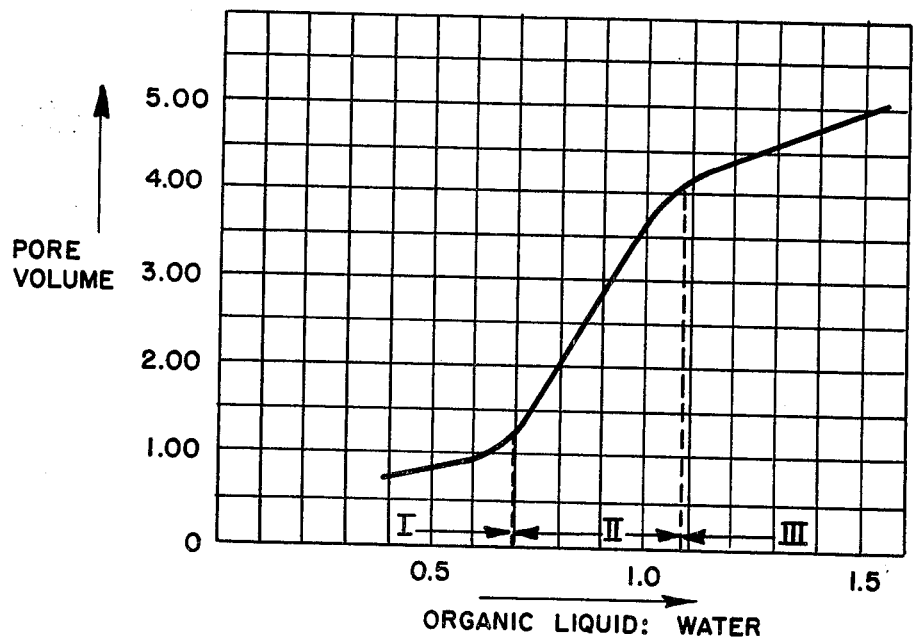
Figure 2:
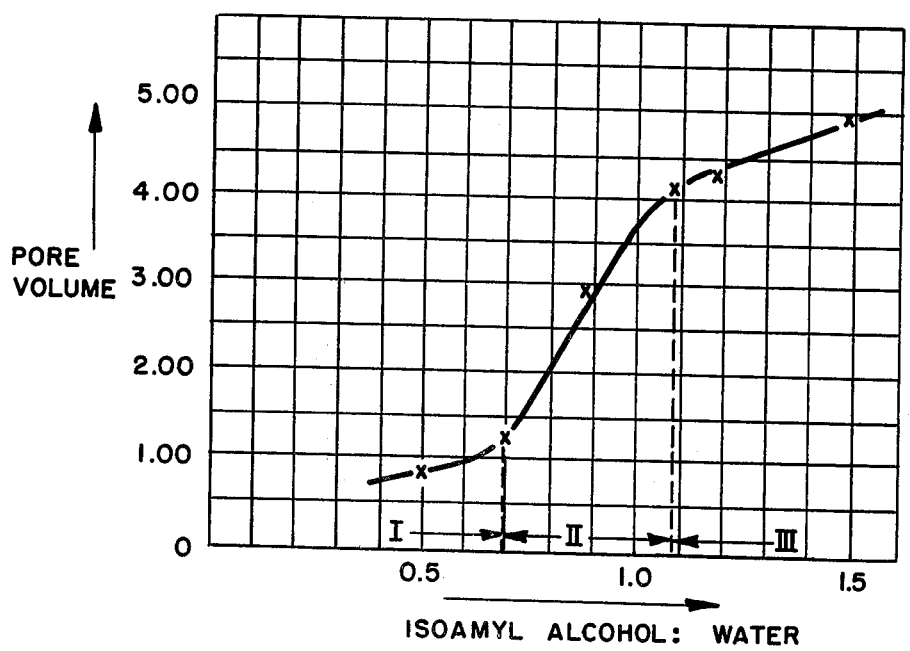

As discussed, the present invention provides a process for the preparation of agglomerates of porous aluminium oxide which does not require an intermediate drying of the aluminium oxide prior to agglomeration thereof. The present process thus alleviates the problem of the prior art processes concerning the shrinkage of the aluminium oxide gel caused by drying the gel in the presence of a large amount of water.

Two important requirements must thus be satisfied to practice the process of the present invention. First, an organic liquid which is essentially immiscible with water must be utilized to replace a portion of said water in the hydrous aluminium oxide gel. Preferably, the organic liquid is an organic material which is immiscible with water, but a small degree of miscibility may be tolerated. Thus, organic materials which have a miscibility of less than about 10 grams per 100 milliliters of water may be utilized in the practice of the present invention. Such organic materials will be considered to be essentially immiscible with water.

Secondly, the amount of the organic liquid utilized must be such that only a portion of the water is removed from the hydrous aluminium oxide gel. The exact amount of organic liquid to be utilized to remove the desired amount of water may be determined by constructing a plot of the weight ratio of organic liquid to water versus the pore volume of the aluminium oxide obtained subsequent to drying and calcination as shown in FIG. I. The curve shown in FIG. I is divided into three distinct regions which may explained in terms of the physical phenomena occurring in each of said regions.

In Region I, the ratio of organic liquid to water is so low that little, if any, water contained in the gel is replaced by the organic liquid. In such an instance, the subsequent drying of the gel is accompanied with a high degree of attraction between the gel particles, resulting in an aluminium oxide composition having a relatively low pore volume.

In Region III, the ratio of organic liquid to water is so high that a very large proportion of the water is replaced by the organic liquid. In such an instance, the attraction between the particles, upon drying, will be minimal, resulting in a highly porous powder to be formed, rather than agglomerates of aluminium oxide. Region II, therefore, represents the desired area in which one should operate, when practicing the process of the present invention. In Zone II, the plotted curve has a relatively steep slope. In such a region, the attraction between the particles, and hence the pore volume, is very dependent upon the remaining amount of the water in the gel. Thus, in such a region, there is a possibility of altering the resultant pore volume, based upon the ratio of organic liquid to water. When one operates within Region II, as shown in FIG. I, one, upon subjecting the aluminium oxide gel, subsequent to being contacted with the organic liquid, to agglomeration conditions, will obtain agglomerates of porous aluminium oxide. This is in contrast to the process taught, for example, in U.S. Pat. No. 3,577,353, in which powders of aluminium oxide, rather than agglomerates, are obtained.

The treatment of aluminium oxide gels with an organic liquid, as described in U.S. Pat. No. 3,577,353 and in the Journal of Catalysis, falls entirely within Region III of the curve shown in FIG. I. Also, in U.S. Pat. No. 3,801,705, practically all of the water contained in the gel is extracted, corresponding to Region III in FIG. I.

For the process according to the present invention, it is thus essential that such an amount of organic liquid, which is essentially immiscible with water, be added so that the ratio of organic liquid to water falls within Region II of a plot, as shown in FIG. I. For any particular organic liquid, the position of the curve may vary, and therefore, the limits of the steep part of the curve may vary with each organic substance, although the general shape of the curve will be analogous. Thus, one may not establish weight ratio limitations for one organic substance based upon data generated for another organic substance. However, it is a relatively simple process to plot a reference curve for any given organic liquid, as will be discussed further hereinbelow.

As discussed, Region II of a plot, as shown in FIG. I, is that portion of the curve which has a relatively steep slope. The exact definition of "steep" may vary, depending upon the exact shape of such a curve for a particular organic liquid. However, in general, one may state that Region II is defined as that portion of the curve which plots the weight ratio of organic liquid to water versus pore diameter, expressed in terms of milliliters per gram, which has a slope equal to or greater than about 4.0.

FIG. II is a plot of a curve, as shown in FIG. I, but for the specific organic liquid, isoamyl alcohol. The method for constructing such a curve will be described hereinbelow under Example 1. If one analyzes FIG. II, one may see that Region II of said curve extends from a weight ratio of isoamyl alcohol to water of from about 0.7 to about 1.08. The slope of the curve in such region is about 8.2 and is thus greater than a slope of 4.0. The slope of the curve in both Region I and Region III is substantially less than 4.0, and thus those portions of the curve are outside of Region II.

The contacting of the hydrous aluminium oxide gel with the organic liquid may be accomplished at ambient temperatures. The time of contacting need only be long enough to allow equilibrium conditions to be established. The agglomeration step utilized in the practice of the present invention is conventional and no detailed explanation thereof is necessary. Thus, any prior art technique for agglomeration may be utilized. For example, the gel which has been contacted with the organic liquid may be placed in a rotary film evaporator and the liquid phase evaporated off with continuous agitation. It is preferred that the liquid phase should be essentially all evaporated off during agglomeration. Thus, one may typically use a tumble dryer or an Eirich granulator for such purposes.

After agglomerates are formed, the remaining liquid phase may be removed by filtration or by continuing the evaporation until essentially all the liquid has been removed. The agglomerates may, of course, be further dried in a vacuum dryer and are finally calcined.

The value of the ratio of organic liquid to water, within Region II, has considerable influence on the properties of the calcined agglomerates. A higher value within said region leads to a larger pore volume, a larger surface area, a greater diameter, and a lower crushing strength. The increase in pore volume is illustrated in FIG. I. The surface area, of course, also increases with decreasing attraction between the gel particles during drying. The increase in diameter and especially the decrease in crushing strength show how essential it is for the present process that only part of the water be removed from the gel. Depending upon the value of the ratio of organic liquid to water, agglomerates may be obtained having a pore volume in the range of 0.4 to 4.5 milliliters per gram, a surface area of 200 to 500 sq. meters per gram, a diameter of 0.5 to 2 milliliters, and a crushing strength of 0.8 to 7.0 pounds.

It should be noted that if the organic liquid of the present invention which is essentially immiscible with water is replaced with an organic liquid which is essentially miscible with water, and the ratio of such organic liquid to water falls within Zone II, and the mixture is subsequently subjected to an agglomerating step, there will be no formation of agglomerates. After drying and calcining, a powdered product would be obtained, rather than agglomerates. Therefore, it is not possible to use, for example, methanol, ethanol, propanol, or isopropyl alcohol in the practice of the present invention.

It is preferred that the organic liquid be an alcohol or ester, which is essentially immiscible with water, such as isobutyl alcohol, amyl alcohol, 4-methyl-2-pentanol, N-heptanol, secondary octyl alcohol, nonanol, ethyl acetate, butyl acetate, or the like. Also, mixtures of such compounds may be utilized. Particularly suitable organic liquids are amyl alcohols, because of the fact that the azeotrope is rich in water and the boiling point is not unusually high, so that the liquid phase may be easily evaporated off. Furthermore, high pore volumes and large surface areas may be obtained at a reasonably high crushing strength.

The hydrous aluminium oxide gel which is utilized in the practice of the present invention may be prepared by any prior art technique. The particular manner in which gelation of the aluminium oxide takes place is of some influence on the product, but is not determinative on the formation of the agglomerates. Thus, if gelation takes place at a temperature above about 30° C., then the gel should be homogenized before the organic liquid is added. Homogenizing at lower gelation temperatures does not adversely affect the practice of the present invention, but such homogenizing is generally not required.

It has also been found that an increase in the solids content of the gel leads to a decrease in the diameter, with the same pore volume being obtained, which may be of advantage, in diffusion-limited processes.

The porous aluminium oxide agglomerates which are obtained by the practice of the present invention may be utilized, for example, as carrier for catalysts. The agglomerates can be impregnated with catalytically active material and such impregnation may take place before, during, or after the formation of the agglomerates, all prior to calcination. Alternatively, the agglomerates may, of course, be impregnated after calcination. The agglomerates may be impregnated with, for example, a solution containing a metal of Group VI of the Periodic Table, such as molybdenum and/or a metal of Group VIII, such as nickel or cobalt. The catalyst particles so obtained would thus be especially suitable for use in fixed-bed and slurry processes.

To increase the strength of the catalyst particles obtained by the present process there may be, during or after gelation of the aluminium oxide, added some amount of clay, such as bentonite, kaolin, or klinoptilonite. If desired, also from about 1 to about 25%, by weight, of silica may be incorporated into the aluminium oxide, for example, by adding some amount of sodium silicate to the mixture prior to gelation. Also, borium oxide, phosphorous pentoxide, titanium oxide and zirconium oxide may be incorporated into the aluminium oxide. The present invention will be described in more detail in the following non-limiting examples. A curve, as shown in FIG. I, may be plotted by adding to an aluminium oxide gel different amount of the desired organic liquid to be used, followed by evaporation and calcination, after which the pore volume of the aluminium oxide powder is determined. To show the plotting of an actual curve, Example 1 adopts the foregoing procedure, utilizing as the organic liquid isoamyl alcohol.

EXAMPLE 1

To plot the reference curve which gives the relationship between the pore volume of the aluminium oxide obtained without agglomeration and the weight ratio of isoamyl alcohol to water the following experiments were carried out.

Into a 1000-liter reactor there were charged 533 liters of demineralized water, 1 kg of sodium silicate and 29.8 kg of sodium aluminate. The temperature was 23° C. Gelation took place upon adding to this mixture 299 kg of a solution of 1.65 percent by weight of aluminium sulphate. The mixture was heated to 49° C. and subsequently filtered. The filtrate was washed four times with 300 liters of water at 50° C. The solids content of the filter cake thus obtained was 5.0 percent by weight.

Into 6 beakers there were each weighed 70 grams of this filter cake. Subsequently, there were added 33, 46, 59, 72, 79 and 99 grams of isoamyl alcohol, respectively. The resulting mixtures were evaporated to dryness on an oil bath of 85° C., and then kept in a vacuum dryer for 17 hours at 120° C., and finally calcined at 540° C. The following Table I as well as the graph in FIG. II show the relationship between the measured mercury pore volume ($PV_{Hg}$) and the weight ratio isoamyl alcohol to water.

TABLE I

| gel sample (70g) | grant of isoamyl alcohol | weight ratio isoamyl alcohol water | PV Total Hg (ml/g) |
| --- | --- | --- | --- |
| I | 33 | 0.50 | 0.86 |
| II | 46 | 0.69 | 1.19 |
| III | 59 | 0.89 | 2.90 |
| IV | 72 | 1.08 | 4.08 |
| V | 79 | 1.19 | 4.31 |
| VI | 99 | 1.49 | 4.95 |

From Table I and FIG. II one may determine that when use is made of the process according to the invention the weight ratio of isoamyl alcohol to water should be in the range of 0.69 to 1.08.

EXAMPLE 2

To 300 grams of an aluminium oxide gel filter cake having a solids content of 6.3 percent, such amounts of isoamyl alcohol were added in three successive experiments that the alcohol to water weight ratios were 0.75, 0.88 and 1.0, respectively.

In a rotary film evaporator the liquid phase was evaporated off with continuous agitation. The pressure was 25 cm Hg. The temperature was first kept at 90° C. for 1.5 hours and subsequently at 120° C. for 1.5 hours. The agglomerates formed were dried at 120° C. in a vacuum dryer for 17 hours and calcined at 540° C. for 4 hours.

Table II below gives the properties of the calcined agglomerates. It shows, amongst other things, the influence of the alcohol to water ratio on the pore volume, the surface area (SA), the diameter and the strength of the agglomerates.

TABLE II

|  | A | B | C |
| --- | --- | --- | --- |
| alcohol/$H_2O$ (weight ratio) | 0.75 | 0.88 | 1.0 |
| $PV_{Hg}$ total (ml/g) | 0.45 | 1.55 | 2.73 |
| SA ($m^2$/g) | 246 | 427 | 469 |
| diameter (mm) | 0.75 | 1.43 | 1.9 |
| crushing strength (lbs/mm) | 5.1 | 3.0 | 1.0 |

EXAMPLE 3

By gelation a filter cake of aluminium oxide gel having a solids content of 7.0 percent was obtained. In successive experiments various organic substances were added to the filter cake.

The amounts of organic liquid per 150 grams of gel are listed in the table below.

All mixtures were rotatingly dried in vacuum (25 cm Hg) at 90° C. In the experiments with isobutyl alcohol and 4-methyl-2-pentanol the temperature was after one hour increased to 120° C. In the other experiments, except in those with isopropyl alcohol, the remaining liquid was decanted after the formation of the agglomerates. The resulting agglomerates were dried in a vacuum dryer for 17 hours at 120° C. and subsequently calcined for 4 hours at 540° C. Table III shows the properties of the calcined agglomerates.

Table III

| organic liquid added | grams of organic liquid per 150g of gel | SA($M^2$/g) | $PV_{Hg}$(ml/g) | φmm |
| --- | --- | --- | --- | --- |
| isopropyl alcohol | 250 | no formation of agglomerates | | |
| isobutyl alcohol | 250 | 375 | 3.72 | 0.6 |
| 4-methyl-2-pentanol | 150 | 315 | 2.04 | 2.7 |

Table III-continued

| organic liquid added | grams of organic liquid per 150g of gel | SA(M²/g) | PV$_{Hg}$(ml/g) | φmm |
| --- | --- | --- | --- | --- |
| heptanol | 150 | 373 | 2.42 | 1.1 |
| sec.octyl alcohol | 150 | 348 | 2.02 | 3.0 |
| nonanol | 200 | 337 | 1.80 | 2.7 |
| butyl acetate | 350 | 359 | 1.13 | 2.2 |

From Table III one may see that the use of isopropyl alcohol in the practice of the present invention does not produce the desired agglomerates.

EXAMPLE 4

The following experiments show the influence of the solids content on the properties of the agglomerates. To 3 filter cakes of an aluminium oxide gel, of 300 grams each, and solids contents of 4.7, 6.3 and 7.7 percent, there were added 250, 246 and 244 grams of isoamyl alcohol, respectively. The mixtures were dried in vacuo (25 cm Hg) in a rotatory film evaporator. The temperature was kept at 90° C. for 1.5 hours and subsequently increased to 120° C. The resulting spherical agglomerates were dried in a vacuum dryer for 17 hours at 120° C. and then calcined for 4 hours at 540° C. The properties of the agglomerates thus obtained are given in Table IV.

TABLE IV

|  | A | B | C |
| --- | --- | --- | --- |
| solids content (%) | 4.70 | 6.30 | 7.70 |
| alcohol/H$_2$O) (weight ratio) | 0.88 | 0.88 | 0.88 |
| PV$_{Hg}$ total (ml/g) | 1.86 | 1.60 | 1.98 |
| SA (m²/g) | 424 | 402 | 432 |
| diameter (mm) | 1.90 | 1.20 | 0.60 |
| crushing strength (lbs) | 7.00 | 4.50 | 1.50 |

EXAMPLE 5

300 Grams of a filter cake of an aluminium oxide gel having a solids content of 6.3 percent were mixed with a solution of 7.5 grams of phosphorous molybdic acid and 6.4 grams of cobalt nitrate in 73.5 grams of water. To this mixture there were added 310 grams of isoamyl alcohol, followed by rotatory drying in vacuo (25 cm Hg), the temperature being kept at 90° C. for 1.5 hours, after which it was increased to 120° C. The agglomerates formed were then dried in a vacuum dryer for 17 hours at 120° C., after which they were calcined for 1 hour at 540° C. The catalyst particles thus obtained were indicated with the letter A.

The above experiment was repeated in such a way that instead of 310 grams, 355 grams of isoamyl alcohol were added. The resulting catalyst was indicated with the letter B. Subsequently, 650 grams of aluminium filter cake having a solids content of 7.8 percent were mixed with a solution of 15.9 grams of phosphorus molybdenic acid and 11.8 grams of cobalt nitrate in 171.5 grams of water. Subsequently, there were added 572 grams of a mixture of normal and isoamyl alcohol (1:1). The agglomerates were formed during rotatory drying in vacuo for 1.5 hours at 90° C. and next at 120° C. The particles obtained were dried in a vacuum dryer for 17 hours at a temperature of 120° C. and finally calcined for 4 hours at 540° C. The resulting catalyst particles were indicated with the letter C. Table V shows the properties of the catalysts A, B and C.

TABLE V

|  | A | B | C |
| --- | --- | --- | --- |
| PV$_{Hg}$ total (ml/g) | 1.23 | 1.90 | 1.85 |
| SA (m²/g) | 363 | 375 | 354 |
| diameter (mm) | 1.0 | 1.4 | 1.2 |
| crushing strength (lbs) | 2.0 | 1.0 | 1.2 |

What is claimed is:

1. A process for the preparation of agglomerates of aluminum oxide comprising contacting a hydrous aluminum oxide gel with an organic liquid which is essentially immiscible with water, the amount of liquid utilized being such that the weight ratio of said liquid to water, as contained in the gel, lies within a portion of a curve which plots said ratio versus the pore volume of aluminum oxide obtained after being dried and calcined, expressed in terms of milliliters per gram, which portion has a slope equal to or greater than about 4.0, and agglomerating the gel subsequent to being contacted with the organic liquid.

2. The process of claim 1 also comprising the steps of removing the liquid phase and subsequently calcining the resulting agglomerates.

3. The process of claim 1 wherein the organic liquid is an alcohol or an ester.

4. The process of claim 1 wherein the organic liquid is selected from the group consisting of isobutyl alcohol, amyl alcohol, 4-methyl-2-pentanol, N-heptanol, secondary octyl alcohol, nonanol, ethyl acetate, butyl acetate, and mixtures thereof.

5. The process of claim 1 further comprising the step of impregnating the aluminium oxide with a catalytically-active material.

* * * * *